UNITED STATES PATENT OFFICE.

GEORGE COWING, OF CLEVELAND, OHIO.

IMPROVEMENT IN MOLDS FOR CASTING STEEL.

Specification forming part of Letters Patent No. 212,902, dated March 4, 1879; application filed September 28, 1877.

*To all whom it may concern:*

Be it known that I, GEORGE COWING, of Cleveland, in the county of Cuyahoga and State of Ohio, have invented certain new and useful Improvements in Molds for Casting Steel, &c.; and I do hereby declare the following to be a full, clear, and exact description of the invention, such as will enable others skilled in the art to which it pertains to make and use it, reference being had to the accompanying drawings, which form part of this specification.

My invention relates to molds and cores for casting steel, and especially steel made by the "open-hearth" furnaces, which comes forth in its melted condition very much hotter than by any other method of melting at present known. It is on account of this intense heat of this molten steel that has arisen the difficulties of its casting, because its contact against the walls of any molds of which I am aware as having been employed for this purpose operates to fuse said walls in such a manner that a flux or scoria is formed, which coats the external surface of the casting, and is exceedingly hard and difficult and troublesome to remove.

Common sand, I am aware, has been experimented with as a substance from which to form molds for the above-mentioned purpose; so, also, has plumbago, charcoal, coke, and other carbons; also, potash and other alkalies; but I have found that all these contain such matter, or are of such a nature, that the heat of molten steel from an open-hearth furnace will form a flux and scoria, as above set forth.

The object of my invention is to form a mold from such a substance that, while sufficient for ordinary use as a molding material, will possess such refractory qualities as to successfully resist the tendency to flux when brought in contact with the hottest molten steel.

For this purpose I construct my molds from pure, or nearly pure, silica, and this for the reason that I have found by extensive experiment and test that when pure silica is employed a steel casting can always be produced entirely free from the flux or scoria referred to; and as pure silica is departed from, in that degree and proportion will the casting be glazed or coated. When the silica is nearly pure, such as can be secured by the use of rock-crystal, white sand, or white pebble, a very good and satisfactory result is obtained.

As before remarked, I am aware that sand has been employed; but it has either been so far from being sufficiently pure silica, or else it has been mixed or powdered with plumbago, charcoal, soot, coke, silicate of potash, or other alkali, or other substances, that the aforementioned flux is formed; and it is probably because a sufficiently pure silica has never yet been employed that sand molds, or molds constructed from powdered stone, &c., are to-day considered impracticable for use in casting steel from an open-hearth furnace.

I profess to be the first to have employed silica in its sufficiently pure condition, and so long as the materials heretofore used (although containing a greater or less proportion of silica) have all contained such foreign matter as that open-hearth steel could not be successfully cast in molds constructed therefrom. Therefore I consider that my discovery and proofs that silica, when sufficiently pure, is actually practicable and operative and economic when employed as herein specified, constitute a new discovery and invention.

The state of the art in this matter, so far as I am aware, demonstrates that many have started in the right direction, and some have nearly reached the point where my invention begins; but all have stopped so far short that open-hearth steel, if cast in any molds heretofore made, produces bad and unsatisfactory results; whereas I am easily enabled by my invention and discovery to cast steel in an entirely acceptacle manner and with the best results.

To prepare my molds I prefer to obtain my silica from rock-crystal, white pebble, or white sand. If white pebble or white sand be taken, they should first be pulverized and thoroughly purified and cleansed from foreign matter, such as metallic oxides, alkalies, &c. When about to be formed into molds, the silica is to be suitably mixed with any appropriate binder, such as molasses, sour beer, flour, starch, any glutinous substance, silicate of aluminum, or the like, care being taken that no substance be employed of the nature of an alkali, or that contains any metallic oxide, or anything that would form a flux. A sufficient quantity of the selected binder is mixed with the pulverized silica to form a mass that can be molded and be retained in the desired shape.

Added to the advantages obtained by the employment of this my invention is the ability to cast mild steel—*i. e.*, steel having a low percentage of carbon—which could not be done in molds consisting of or containing plumbago, charcoal, coke, or other form of carbon.

What I claim is—

Molds or cores composed of or constructed from a mass consisting of silica in its pure, or nearly pure, condition, and a binding or cohesive substance, substantially as and for the purpose specified.

In testimony whereof I have signed my name to this specification in the presence of two subscribing witnesses.

GEORGE COWING.

Witnesses:
F. TOUMEY,
W. E. DONNELLY.